(12) United States Patent
Fröschle et al.

(10) Patent No.: US 7,600,805 B2
(45) Date of Patent: Oct. 13, 2009

(54) ANCHORING CONFIGURATION FOR A REAR SECTION OF A TOP CLOTH AND CONVERTIBLE

(75) Inventors: Mathias Fröschle, Ostfildern (DE); Timo Czechtizky, Zell U. A. (DE)

(73) Assignee: Dr. Ing. h.c. F. Porsche AG, Weissach (DE)

( * ) Notice: Subject to any disclaimer, the term of this patent is extended or adjusted under 35 U.S.C. 154(b) by 15 days.

(21) Appl. No.: 11/852,410

(22) Filed: Sep. 10, 2007

(65) Prior Publication Data

US 2008/0061589 A1   Mar. 13, 2008

(30) Foreign Application Priority Data

Sep. 8, 2006   (DE) ...................... 10 2006 042 291

(51) Int. Cl.
*B60J 7/12* (2006.01)
(52) U.S. Cl. .................... 296/121; 296/107.05; 296/213
(58) Field of Classification Search ............ 296/107.04, 296/107.05, 135, 213, 100.15–100.16, 121
See application file for complete search history.

(56) References Cited

U.S. PATENT DOCUMENTS

| 3,630,568 | A | * | 12/1971 | Podwys ...................... 296/116 |
| 5,267,771 | A | | 12/1993 | Rothe |
| 5,738,402 | A | * | 4/1998 | Aydt et al. .................. 296/118 |
| 6,886,880 | B2 | | 5/2005 | Heselhaus |
| 2007/0145784 | A1 | * | 6/2007 | Kapshandy et al. ......... 296/213 |

FOREIGN PATENT DOCUMENTS

| DE | 91 02 150.2 U1 | 5/1991 |
| DE | 197 50 418 A1 | 5/1999 |
| DE | 100 29 471 A1 | 1/2002 |
| EP | 1 398 189 A2 | 3/2004 |
| WO | 2006/105744 A1 | 10/2006 |

* cited by examiner

*Primary Examiner*—Dennis H Pedder

(57) ABSTRACT

An anchoring configuration for a rear end section of a top cloth. The anchoring configuration has a fastening strip, which can be connected by a first strip section to the top cloth and by a second strip section releasably to a body element of a convertible. The fastening strip is of a flexible construction at least in some regions, and has a water collecting profile which runs in a transverse direction of the convertible and is disposed below the rear end section of the top cloth. In order to simplify the anchoring configuration, the first strip section of the fastening strip is configured as the water collecting profile.

15 Claims, 3 Drawing Sheets

ANCHORING CONFIGURATION FOR A REAR SECTION OF A TOP CLOTH AND CONVERTIBLE

This application claims the priority, under 35 U.S.C. § 119, of German application DE 10 2006 042 291.0, filed Sep. 8, 2006; the prior application is herewith incorporated by reference in its entirety.

BACKGROUND OF THE INVENTION

Field of the Invention

The invention is based on an anchoring configuration for a rear section of a top cloth. The anchoring configuration has a fastening strip, which can be connected by a first strip section to the top cloth and by a second strip section releasably to a body element of a convertible and which is of flexible configuration at least in some regions. The fastening strip further has a water collecting profile which runs in the transverse direction of the vehicle and is disposed below the rear end section of the top cloth.

A generic anchoring configuration on a convertible is apparent from German Utility Model DE 91 02 150 U1 and serves for the tensioned fastening of an end section of a top cloth to the convertible body. The rear end section of the top cloth is connected fixedly to a first strip section of an elastic fastening strip, for example by a seam. A second strip section of the fastening strip is connected to a body element of the convertible, i.e. is placed onto the body element. The body element is configured as a sheet-metal shaped part in such a manner that it forms a water collecting profile which runs in the manner of a channel in the transverse direction of the vehicle and is disposed below the end section of the top cloth such that water penetrating between a top compartment lid and the top cloth can be collected.

BRIEF SUMMARY OF THE INVENTION

It is accordingly an object of the invention to provide an anchoring configuration for a rear section of a top cloth and a convertible which overcomes the above-mentioned disadvantages of the prior art devices of this general type, which provides a simplified anchoring configuration.

With the foregoing and other objects in view there is provided, in accordance with the invention an anchoring configuration for a rear end section of a top cloth. The anchoring configuration contains a fastening strip having a first strip section for connecting to the top cloth and a second strip section releasably connected to a body element of a convertible. The fastening strip has a flexible body at least in some regions and a water collecting profile running in a transverse direction of the convertible and is disposed below the rear end section of the top cloth. The first strip section of the fastening strip is configured as the water collecting profile.

The advantages primarily obtained by the invention can be seen in that, with the fastening strip according to the invention, both the top cloth can be fastened to the body element and the water collecting profile is formed by the fastening strip, namely by the first strip section, as a result of which the sheet-metal profile known from the prior art as the water collecting profile is no longer required. In addition, it is advantageous that, by fastening the end section directly to the water collecting profile, a separating point can be saved on, since the fastening strip is no longer placed onto the body element.

In an exemplary embodiment, the water collecting profile is entirely formed by the first strip section.

The water guidance or the seal tightness between the top cloth and the water collecting profile is further optimized if an end section of the top cloth is positioned such that it reaches into the water collecting profile and is preferably fastened releasably there by form-fitting elements.

According to an exemplary embodiment, the fastening strip is accessible in a manner advantageous for installation in order to be able to releasably connect it to the body element, for example to a wall of a top compartment, in a simple manner. This is advantageous in particular in the case of a convertible, the driving engine of which is inserted into the body in a central engine configuration, since the top cloth has to be released now and again for maintenance work to the driving unit (engine with transmission).

According to an exemplary embodiment, the rear end section of the top cloth can be connected generally entirely to the body element.

According to another exemplary embodiment, only relatively few fastening elements are necessary in order to be able to connect the fastening strip to the body element, which significantly reduces the installation time.

If there is a body opening, on the top compartment, the fastening strip, which is of a flexible configuration at least in some sections, can readily be inserted into the top compartment by its free ends being moved toward each other, i.e. being virtually bent.

Other features which are considered as characteristic for the invention are set forth in the appended claims.

Although the invention is illustrated and described herein as embodied in an anchoring configuration for a rear section of a top cloth and a convertible, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF A PREFERRED EMBODIMENT OF THE INVENTION

Figure 1:
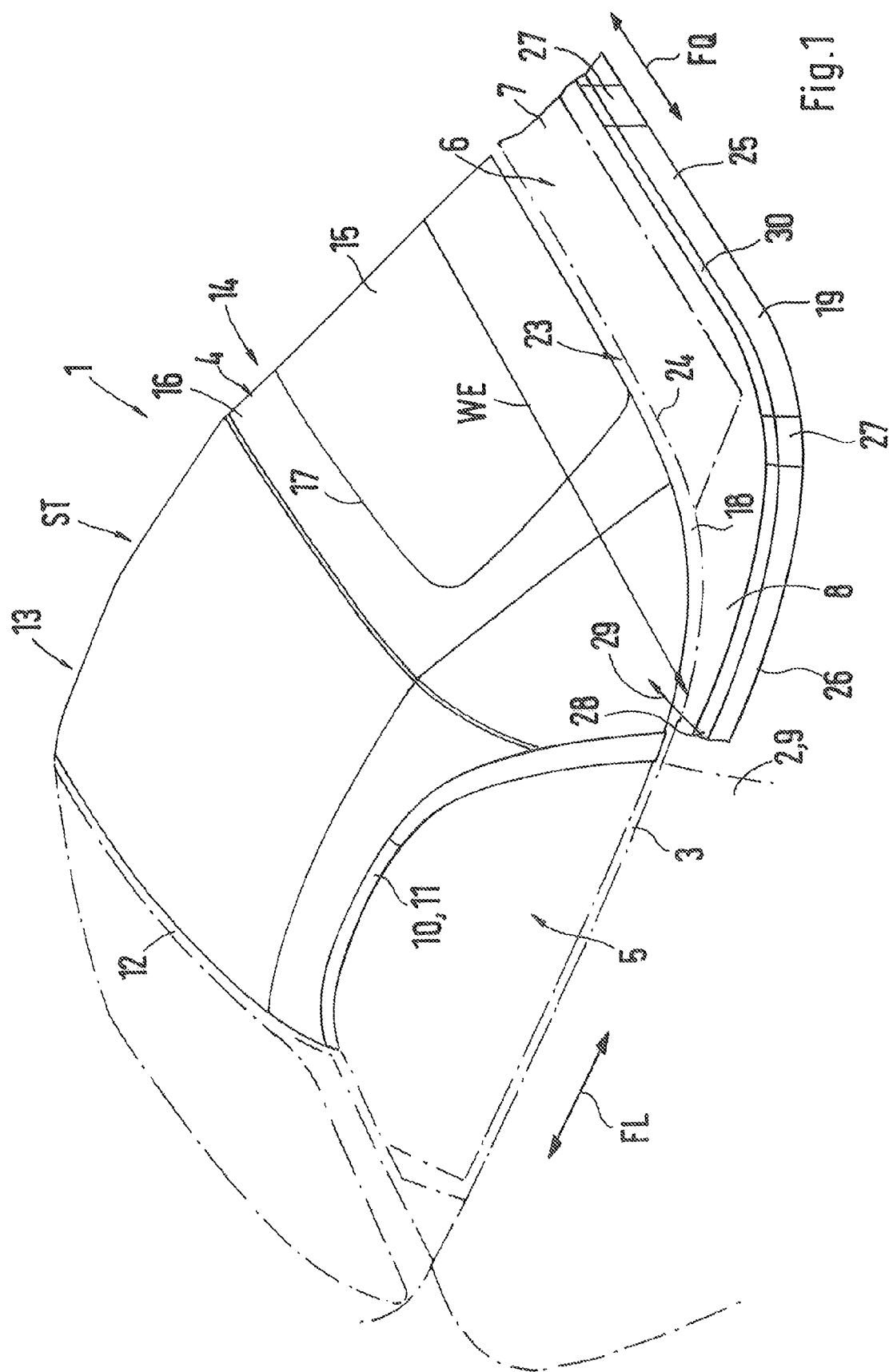
FIG. 1 is a diagrammatic, perspective view of a part of a convertible with a top in the closed position.

Referring now to the figures of the drawing in detail and first, particularly, to FIG. 1 thereof, there is shown part of a convertible 1, which is also referred to as an open motor vehicle. Only one half of the vehicle is illustrated with respect to a longitudinal center plane; but the other half of the vehicle (not shown) is of mirror-inverted design and is therefore not explained in more detail. The convertible 1 has a body 2 onto which a top 4 is placed above a belt line 3, which top can be moved from a closed position ST, in which it spans a passenger compartment 5, into a non-illustrated collapsed storage position in a rear top compartment 6. The rear top compartment 6 is partially closed upward by a fixed, i.e. immovable top compartment lid 7 which adjoins a rear side wall 8 and which forms a part of an outer skin 9 of the body 2. Below the top compartment 7, a non-illustrated driving unit is inserted into an engine compartment (which likewise cannot be seen) in a "central engine configuration".

Figure 2:
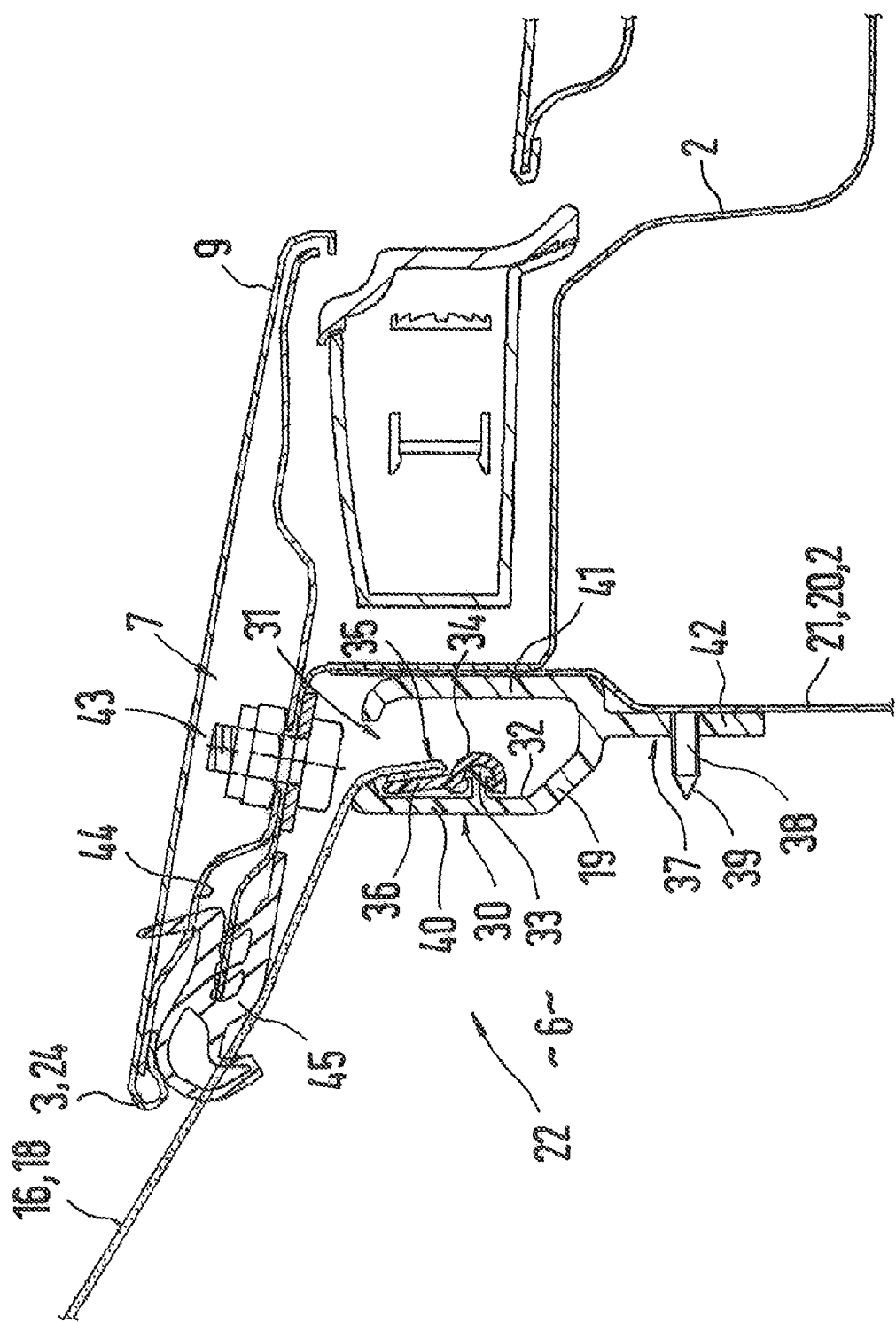
FIG. 2 is a sectional view through an anchoring device.
Figure 3:
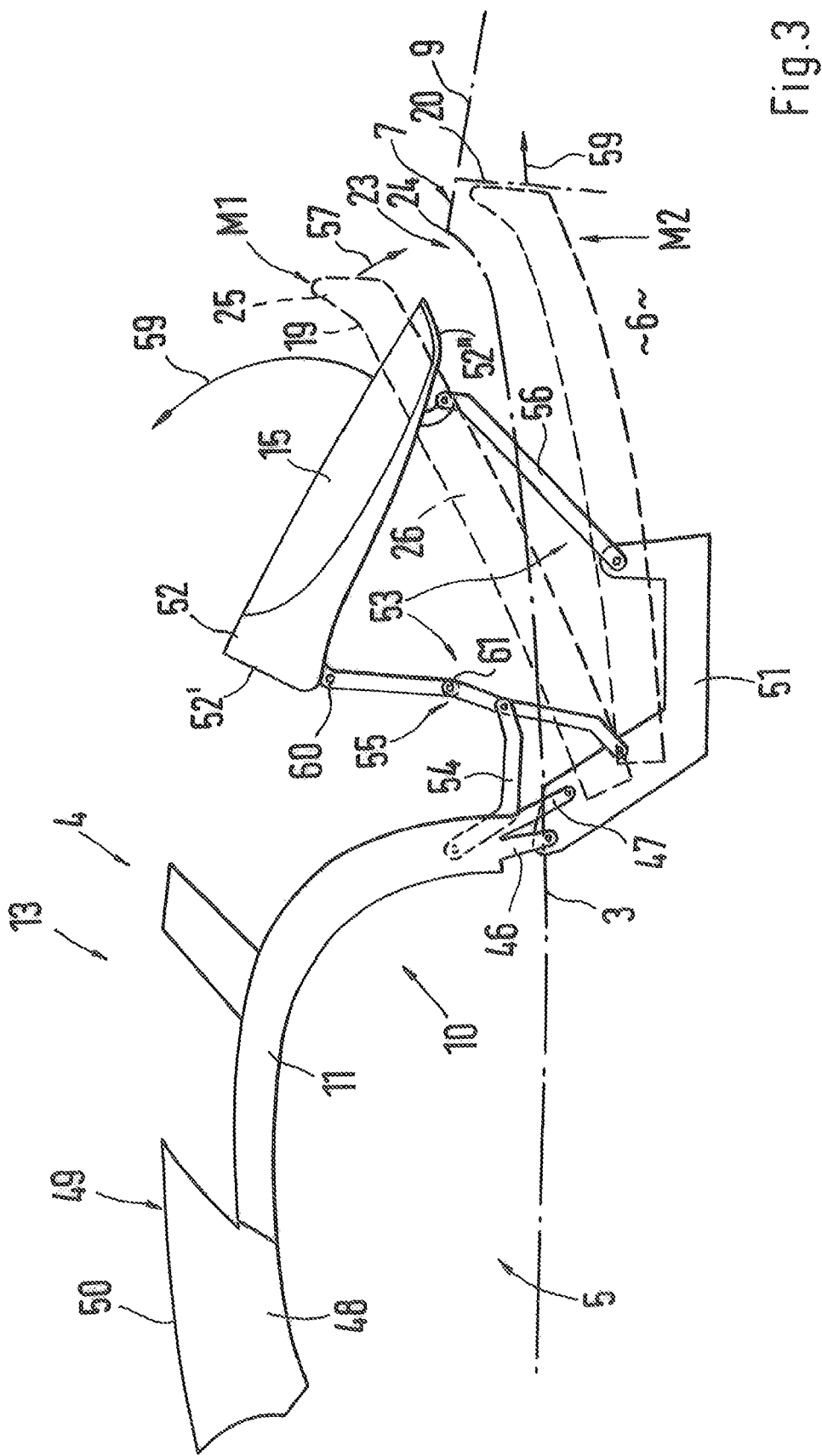
FIG. 3 is a diagrammatic, side view of the top, which is now illustrated without the top cloth, with a fastening strip of the anchoring device upon insertion into a top compartment.

The top 4 has a top framework 10, see FIG. 3 too, of which, in FIG. 1, only a lateral, curved roof frame 11 can be seen which extends beyond the belt line 3 as far as an upper cowl 12. Furthermore, the top 4 has a plurality of roof sections, preferably two roof sections 13 and 14, of which the roof section 13 forms a front roof part and the roof section 14 forms a rear roof part with a rear window 15. A top cloth 16 which is equipped with a window cutout 17 for the rear window 15 is held, at least in some sections, on the top framework 10. The top cloth 16 extends between the two roof frames 11 with a rear end section 18 to below the belt line 3 and is held releasably there by a U-shaped fastening strip 19—as seen in plan view—on a body element 20, preferably on a wall 21 bounding the rear top compartment 6 (FIG. 2), in such a manner that, in the closed position ST, the top cloth 16 is held in position with the desired tensioning of the fabric and the end section 18 is anchored to a point below the belt line 3, for which purpose an anchoring configuration 22 is provided which has at least the fastening strip 19 and which is described in more detail further below in conjunction with FIG. 2.

FIG. 1 furthermore shows a rear upper body opening 23 through which the top 4 can be put away into the rear top compartment 6 situated below it. The body opening 23 is bounded on the rear side by the side walls 8 and by the top compartment lid 7. Its boundary border 24 is therefore situated in the belt line 3. The body opening 23 has an opening width WE measured between the side walls 8 in a transverse direction FQ of the vehicle. The U-shaped fastening strip 19 situated below the outer skin 9 has a base 25 which extends in the transverse direction FQ of the vehicle. Limbs 26 emerge from the base 25 and are oriented forward in the longitudinal direction FL of the vehicle in the direction of a front end of the vehicle. It is apparent that the extent of the fastening strip 19 in the transverse direction FQ of the vehicle is larger than the opening width WE of the body opening 23. In order to be able to insert the fastening strip 19, which is connected to the end section 18 of the top cloth 16, through the body opening 23 into the top compartment 6, the fastening strip 19 is of bendable construction in at least one bending section 27. As a result, the free ends 28 of the limbs can be moved toward each other (arrow 29), i.e. the fastening strip 19 can be bent in such a manner that it fits through the body opening 23. As an alternative, a hinge, in particular film hinge, can be provided instead of the bending section 27. It would furthermore be conceivable, instead of the central bending section 27, to form one or two lateral bending sections 27 adjacent to the limbs 26 or in the limbs 26 or to provide a hinge there. In a further alternative, the entire fastening strip 19 can be configured as a bendable plastic profile.

According to FIG. 2, the fastening strip 19 located below the end section 18 has a first strip section 30 to which the top cloth 16 is fastened, preferably releasably, by its end section 18. The strip section 30 is configured as a water collecting profile 31 and, for this purpose, has a U-shaped or V-shaped cross section such that water entering between the top cloth 16 and the boundary border 24 of the body opening 23 can be collected. The end section 18 of the top cloth 16 is positioned such that it reaches into the interior of the water collecting profile 31 and is connected there. At least one first form-fitting element 33, in particular a mushroom profile or a mushroom pin, emerges, preferably integrally, from an inner wall 32 of the water collecting profile 31. A counterpart as the second form-fitting element 34 is fitted in the border region 35 of the end section 18. In order to fasten the end section 18 to the water collecting profile 31, both form-fitting elements 33 and 34 are brought into engagement with each other. The second form-fitting element 34 is formed, for example, on a strip-shaped weather strip 36 which is made of plastic and can be injection molded onto or sewn to or adhesively bonded to the border region 35. As an alternative, the border region 35 can be fastened to the inner wall 32 by adhesive bonding; other fastening measures would also be conceivable.

The fastening strip 19 has a second strip section 37 which is connected to the first strip section 30. The second strip section 37 forms a fastening section by which the fastening strip 19 can be fastened releasably to the body element 20. The strip-shaped strip section 37 bears against the body element 20 and is held thereon by at least one fastening element 38. The strip section 37 is penetrated by the fastening element 38 which is fastened to the body element 20. A non-illustrated securing device, for example a screw nut, can be fitted onto a free end 39 of the fastening element 38, in particular a fixing bolt, in order to hold the fastening strip 19 on the body element 20. A plurality of fastening elements 38 can be distributed over the extent of the fastening strip 19. At least one fastening element 38 is provided in each case in particular for each limb 26 and the base 25.

As mentioned above, the fastening strip 19 can be configured integrally and, in particular, as a plastic profile. In order to form the two strip sections 30 and 37, the fastening strip 19 is therefore of approximately fork-shaped or Y-shaped design in cross section, with at least two fork sections 40 and 41 forming the water collecting profile 31 or the first strip section 30 and a base section 42 forming the second strip section 37. The two fork sections 40 and 41 emerge from the base section 42.

It is also apparent from FIG. 2 that the fixed top compartment lid 7 is fastened to the body 2 and, for example, to an extension of the body element 20, and is preferably screwed on there, for which purpose a screw connection 43 can be used. The screw connection 43 is located on a lower side 44 of the top compartment lid 7, which side faces the top compartment 6. In addition, this lower side 44 is also assigned, adjacent to the boundary border 24, a sealing profile 45 which rests on the top cloth 16 when the top is in the closed position ST. The sealing profile 45 can be fastened to the extension of the body element 20 or to the top compartment lid 7.

The top 4 is explained in more detail with reference to FIG. 3, with the same parts as in FIGS. 1 and 2 being provided with the same reference numbers; the top framework 10 is located below the top cloth 16 (not shown) and has the roof frame 11 which, in the closed position ST, is formed, for example, by two main links 46 and 47 and by a fixed section 48 which is connected thereto and can be part of a "front integral roof frame" 49 which has a sheetlike section 50 between the lateral roof frames. Via the main links 46 and 47, the front roof section 13 is supported movably on a top bearing 51 located below the belt line 3. The rear roof section 14 which has the rear window 15 surrounded by a frame 52 is supported movably via a link configuration 53, for example on the top bearing 51 or the body 2, and is connected kinematically into the top framework 10 via a coupling link 54. A front linkage 55 of the link configuration 53 is connected to the coupling link 54 and extends between an upper frame limb 52' of the frame 52 and the top bearing 51. Adjacent to a lower frame limb 52", a rear linkage 56 likewise connects the frame 52 to the top bearing 51.

For the installation of the top 4 on the body 2, the procedure is as follows: the constructional unit containing the top bearing 51 and the top 4, which may, if appropriate, also include a non-illustrated roll bar configuration on which the top bearing 51 can be fitted, is inserted into the body 2. In the process, the end section 18 of the top cloth 16 is fastened to the fastening strip 19 which is shown in an upper pre-installation position M1 (shown by dashed lines) in FIG. 3. As described above, in the pre-installation position M1, the fastening strip 19 with its base 25 and the limbs 26 is bent in such a manner that it can be inserted through the body opening 23 into the top compartment 6, i.e. pivoted downward, which is indicated by an arrow 57. After the fastening strip 19 has passed through the body opening 23 and is located within the rear top compartment 6, it is displaced rearward (arrow 58) into its final installation position M2 (shown by dashed lines) until it bears against the body element 20; it is subsequently fastened releasably to the body element 20 via the fastening elements 38.

If access to the engine compartment located below the rear top compartment 6 is to be provided, for example for maintenance work to the driving unit, the fastening elements 38 for the fastening strip 19 are released again and the fastening strip 19 is removed again in the reverse sequence from the top compartment 6. The frame 52 of the rear window 15 is then at least partially released from the link configuration 53, and therefore the rear roof part 14 together with the top cloth 16 and the fastening strip 19 can be pivoted in the arrow direction 59. Preferably only the rear linkage 56 is released from the rear window frame 52, and therefore the rear roof part can be pivoted in the arrow direction 59 about an axis of articulation 60 and/or 61 of the front linkage 55, as a result of which the rear top compartment 6 is opened up; there is therefore also access to the engine compartment located below it.

The invention claimed is:

1. An anchoring configuration for a rear end section of a top cloth, the anchoring configuration comprising:
   a fastening strip having a first strip section for connecting to the top cloth and a second strip section releasably connected to a body element of a convertible, said fastening strip having a flexible body at least in some regions and a water collecting profile running in a transverse direction of the convertible and is disposed below the rear end section of the top cloth, said first strip section of said fastening strip is configured as said water collecting profile, said fastening strip having a substantially fork-shaped configuration in cross section with at least two fork sections and a base section, said fork sections forming said water collecting profile and said base section forming said second strip section.

2. The anchoring configuration according to claim 1, wherein said water collecting profile has a cross section with a shape selected from the group consisting of approximately U-shaped cross sections and approximately V-shaped cross sections.

3. The anchoring configuration according to claim 1, wherein the rear end section of the top cloth is positioned such that the rear end section reaches into said water collecting profile.

4. The anchoring configuration according to claim 1, wherein said fastening strip with said first and second strip sections is at least in some sections a plastic profile.

5. An anchoring configuration for a rear end section of a top cloth, the anchoring configuration comprising:
   a fastening strip having a first strip section for connecting to the top cloth and a second strip section releasably connected to a body element of a convertible, said fastening strip having a flexible body at least in some regions and a water collecting profile running in a transverse direction of the convertible and is disposed below the rear end section of the top cloth, said first strip section of said fastening strip is configured as said water collecting profile, one of said first strip section and said water collecting profile having at least one first form-fitting element situated on an inside, and a second form-fitting element is formed on the rear end section of the top cloth, said first and second form-fitting elements engaging one inside the other to fasten the rear end section to said water collecting profile.

6. The anchoring configuration according to claim 1, wherein said fastening strip—as seen in plan view—is of a generally U-shaped configuration with a portion running in the transverse direction of the convertible and with lateral limbs running in a longitudinal direction of the convertible.

7. The anchoring configuration according to claim 6,
   further comprising fastening elements for releasably connecting said fastening strip to the body element, at least one of said fastening elements engaging each of said portions and said lateral limbs of said fastening strip.

8. A convertible, comprising:
   a body element;
   a top having a top cloth with a rear end section; and
   a fastening strip having a first strip section connecting to said top cloth and a second strip section releasably connected to said body element, said fastening strip having a flexible body at least in some regions and a water collecting profile running in a transverse direction of the convertible and is disposed below said rear end section of said top cloth, said first strip section of said fastening strip configured as said water collecting profile, said fastening strip having a substantially fork-shaped configuration in cross section with at least two fork sections and a base section, said fork sections forming said water collecting profile and said base section forming said second strip section.

9. The convertible according to claim 8, further comprising:
   a top compartment; and
   a fixed top compartment lid at least partially closing said top compartment for accommodating said top in a stored position.

10. The convertible according to claim 9, wherein said fixed top compartment lid has—as seen in plan view—an upper body opening formed therein with an opening width which is measured in the transverse direction of the convertible and said opening width is smaller than a extent of said fastening strip in the transverse direction of the convertible.

11. The anchoring configuration according to claim 5, wherein said water collecting profile has a cross section with a shape selected from the group consisting of approximately U-shaped cross sections and approximately V-shaped cross sections.

12. The anchoring configuration according to claim 5, wherein the rear end section of the top cloth is positioned such that the rear end section reaches into said water collecting profile.

13. The anchoring configuration according to claim 5, wherein said fastening strip with said first and second strip sections is at least in some sections a plastic profile.

14. The anchoring configuration according to claim 5, wherein said fastening strip—as seen in plan view—is of a generally U-shaped configuration with a base running in the transverse direction of the convertible and with lateral limbs which adjoin said base and run in a longitudinal direction of the convertible.

15. The anchoring configuration according to claim 14, further comprising fastening elements for releasably connecting said fastening strip to the body element, at least one of said fastening elements engaging each of said base and said two limbs of said fastening strip.

* * * * *